United States Patent [19]
Cai et al.

[11] Patent Number: 5,825,023
[45] Date of Patent: Oct. 20, 1998

[54] AUTO FOCUS LASER ENCODER HAVING THREE LIGHT BEAMS AND A REFLECTIVE GRATING

[75] Inventors: Lilong Cai, Sai Kung; Jihua Zhang, Clear Water Bay, both of Hong Kong

[73] Assignee: The Hong Kong University of Science & Technology, Hong Kong

[21] Appl. No.: 824,759

[22] Filed: Mar. 26, 1997

[51] Int. Cl.[6] .................................................. H01J 3/14
[52] U.S. Cl. ................................. 250/237 G; 250/559.29
[58] Field of Search .......................... 250/237 G, 559.29, 250/559.32; 356/375

*Primary Examiner*—Que Le
*Attorney, Agent, or Firm*—Burns, Doane, Swecker & Mathis, L.L.P.

[57] ABSTRACT

An auto-focus laser incremental encoder for measuring linear or rotary motion or position of an object is described. An optical read head focuses three laser beams on the surface of a scaling grating. The grating is a reflection type grating where the height difference between adjacent pixels is one quarter of the wavelength of the laser light whereby the pitch of the grating can be detected by interferometric reflection. There are two sections of grating displaced with respect to each other so that a direction of movement can be readily determined. The third beam acts to provide an autofocus and is reflected from a smooth part of the grating between the two sections of reflective grating.

16 Claims, 5 Drawing Sheets

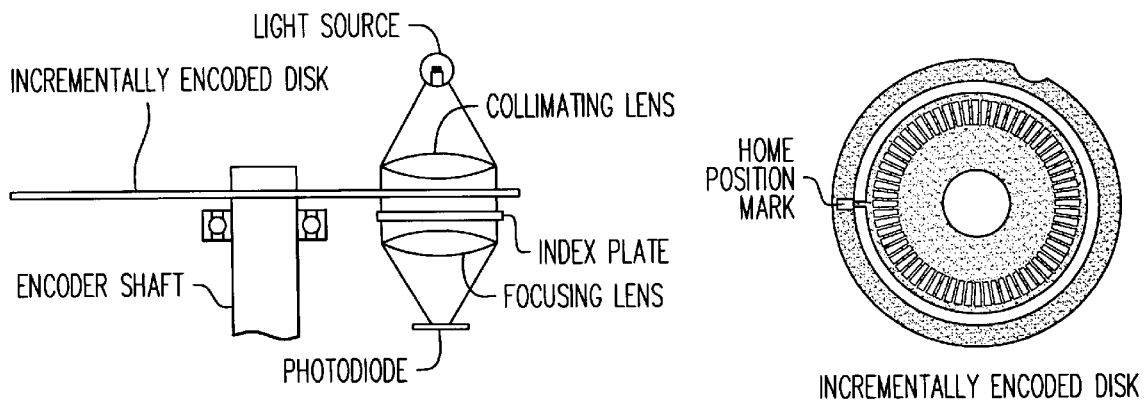
FIG. 1a  FIG. 1b
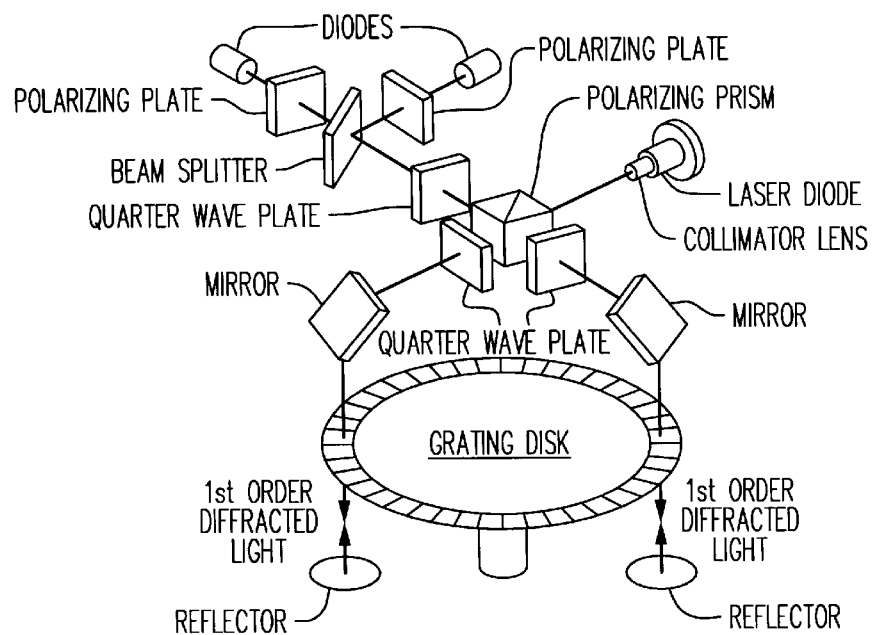
FIG. 2

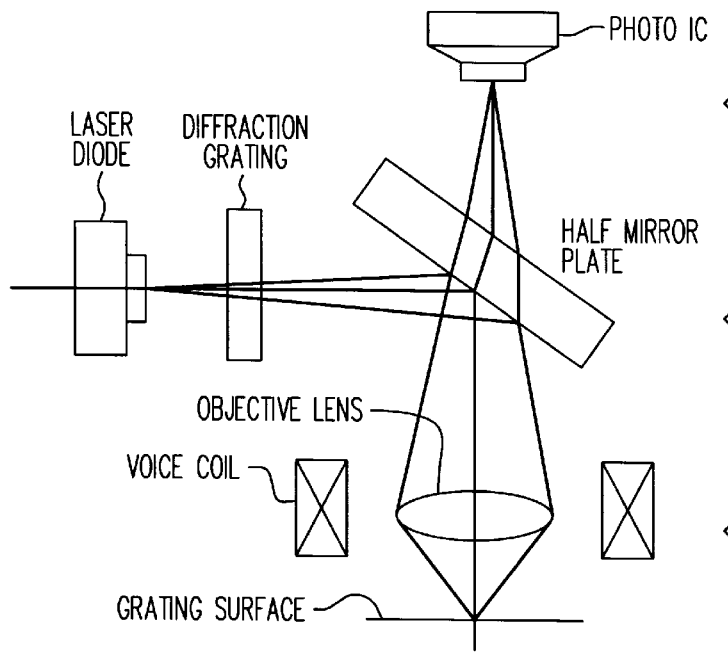
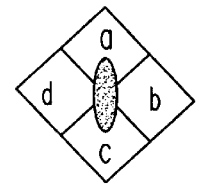
FIG. 8a
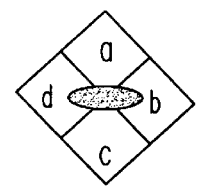
FIG. 8b
FIG. 8c
FIG. 8
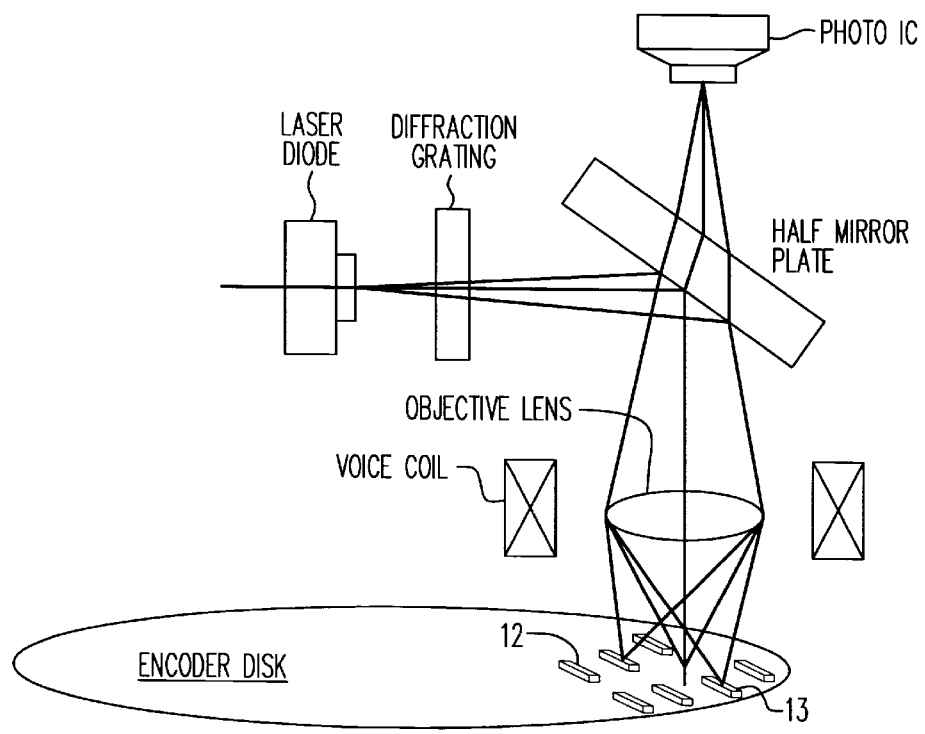
FIG. 9

AUTO FOCUS LASER ENCODER HAVING THREE LIGHT BEAMS AND A REFLECTIVE GRATING

BACKGROUND OF THE INVENTION

1. Field of the Invention

The present invention relates to position sensors or an encoder for photoelectrically measuring the linear motion or angular rotation of an object. In particular the present invention relates to the main applications of the encoders for use in the fields of metrology, control, alignment techniques, precision engineering and manufacturing.

2. Description of the Related Art

In a conventional incremental optical encoder, the moire effect is popularly used to give position information. To eliminate the diffraction effects, the pitch of the grating to be used should be coarse with respect to the wavelength of the light. After interpolation, the encoder provides a resolution of approximately 10 down to 0.5 µm.

A typical incremental rotary optical encoder is constructed as shown in FIG. 1. An encoder scale disk is divided alternately into optically opaque and transparent sectors. A fixed index scale grating comprises opaque and transparent sectors of the same pitch as those of the scale disk. A collimated beam from a light emitting diode (LED) is used to illuminate the scale disk and index scale grating. A photodiode is used to receive the transmitted light irradiated from the two overlapping slit arrays. The resolution of the encoder is primarily a function of the number of opaque and transparent sectors. A smaller pitch of the slits can improve the resolution. However scale line pitch is limited by diffraction effects to about 125 lines/mm. The typical resolution of this method is between 100 and 100,000 counts for 1 complete revolution.

To improve the resolution, a fine pitch scaling grating should be selected. In U.S. Pat. Nos. 5,101,102, 5,146,085, 5,059,791 and 5,017,777, the encoders are based on the diffraction of an illuminating laser beam at a grating disk of a short period and the detection of the interference pattern of selected diffraction orders. Such an encoder designed by Canon Inc. is shown schematically in FIG. 2. The intensity of the interference pattern from the two first-order diffracted waves is modulated by rotation of the grating disk. For a grating disk having N slits on its circumference, one rotation of the grating disk can generate 2N to 4N pulses of the signal. The resolution measures down to 10 nm for a linear encoder and a total resolution of 324,000 to 1,296,000 counts per revolution with 4×quadrature multiplication is available for a rotary encoder. Although the encoder is capable of a high resolution, the structure of the encoder is complicated and the cost of the encoder is high.

An interferometrically readable optical encoder is disclosed in the U.S. Pat. Nos. 5,451,776 and 5,336,884. Several series of incremental marks are fabricated on the encoder disk. The optical fibers are used to detect the interferometric reflection of coherent light from the marks as representative of a binary 1 or binary 0. The linear displacement can be resolved to within 1/160,000 of an inch and the angular displacement can be resolved to within 1/160,000 of a single rotation.

In European patent application 0638810A1, the encoder disk comprises an information layer in the form of successive pits written by a laser beam. The pits possess a specific optical property that substantially differs from that of the surrounding surface of said information layer. Because the pits are very small, at least one boundary track should be applied in addition to said information track. Although this invention possesses high spatial resolution, it is difficult to determine the moving direction. Besides, since the laser spot is used to either scan the pits or auto focus the beam, some crosstalk will occur between the focus error signal and the pits signal, and the overshoot is difficult to filter because the scan frequency is not constant due to the unknown speed of the encoder.

SUMMARY OF THE INVENTION

According to the present invention there is provided apparatus for sensing the position and/or movement of an object, comprising: a laser source for generating laser light, means for dividing said laser light into three beams, a reflective grating adapted to be mounted on a said object the position and/or movement of which is to be measured, means for focussing said beams onto said grating, and means for detecting said beams reflected from said grating and for detecting any change in intensity of said reflected beams consequent upon movement of said grating.

The present invention provides an encoder disk with the pitch of the grating close to the laser's wavelength. The working principle of the read head is based on the interferometric reflection of coherent light from the edge of the phase grating. Three focused beams are used in the encoder. The two side beams are used to generate an out-of phase signal, which allow the interpolation of the signal and determination of the moving direction. The middle beam is used to carry out the auto focus operation to keep the minimum spot size scanning the grating. Therefore, a higher optical resolution and accuracy can be obtained without interpolation and there will be no overshoot in this set up because the middle beam scans only the smooth region of the surface. More particularly, even with a very small dimension of the encoder disk, a reasonable number of pulses per revolution can be generated. For example, an encoder disk with 2 mm diameter can achieve 12-bit resolution without interpolation and an encoder disk with 160 mm diameter can achieve 1,296,000 counts per revolution (1 arcsecond) with 4×quadrature multiplication. The resolution is about 20-bit.

In addition, the reading device of the encoder system is simple, cheap, and easy to install compared with encoders that utilize diffraction interference methods.

Briefly stated, the present invention comprises a reflective type of phase grating and an optical read head for digitally representing the spatial position of a linear motion or a rotatable shaft. In particular, the method and apparatus of the present invention can be used to determine the linear motion or angular rotation of an object.

One embodiment is a laser linear encoder comprising a linear scaling grating and an optical read head. The scaling grating includes two sections of reflective type of phase grating which are 90 degree out-of-phase. Between the grating region on the encoder, there is a smooth region without a grating. The height difference between adjacent pixels of the phase grating is one-quarter of the laser wavelength. The optical read head includes a laser diode, a three beam diffraction grating, an objective lens, a focusing actuator and a six segment photodetector.

The other embodiment is a rotary encoder. It simply uses a circular scaling grating to replace the linear scaling grating in the linear encoder.

The diffraction grating splits the beam from the laser diode into three beams, a middle beam and two side beams.

The middle be is focused on the smooth region without a grating structure. The two side beams are focused on two sections of reflective type of phase grating respectively. The two returned side beams are received by two detectors respectively to indicate the out-of-phase grating signals. The returned middle beam is received by a quadratic photodetector to indicate the focus error signal. The operation of the auto focus can keep a minimum and constant spot size of two side beams to scan the phase grating, which has a grating pitch of close to the laser's wavelength. Because the height difference between the pit and land of the grating is exactly one-quarter of the laser's wavelength, when the spot is exactly located on the edge of the pit and land, light reflected by the land travels at a distance one-half of the wavelength further than the light reflected by the pit. The phase difference causes the two parts of the beam to interfere destructively with and cancel each other. Meanwhile, there is no evident difference between the reflection from the pure pit and land. A transverse movement between the optical head and the scaling grating results in changes in the optical intensity received by the side beam detectors, which are related to the displacement or angular rotation. If the pitch of the grating is slightly smaller than the spot size of the laser beam, an approximate sinusoidal wave will be generated, which allows for 4×interpolation. Therefore, a high resolution can be achieved.

The advantages of the present invention are: (1) the encoder involves only two parts of optical components and no index grating is required; (2) the encoder is less sensitive to the gap between the optical read head and the scaling grating and no precision adjustment is required; (3) the encoder possesses a high optical resolution and accuracy; (4) it is shock-proof and less susceptible to error due to vibration; (5) the profile of the grating surface does not affect the encoder in reading out the position information; (6) the encoder is characterized by compactness, lower weight and lower cost.

BRIEF DESCRIPTION OF THE DRAWINGS

Two embodiments of the invention will now be described by way of example and with reference to the accompanying drawings, in which:

FIG. 1 is a diagram of a conventional rotary encoder,

FIG. 2 is a diagram of diffraction type of laser rotary encoder,

FIG. 8 is a diagram illustrating the focus spot to scan the step of the grating, FIG. 9 is a diagram of a rotary encoder according to a second embodiment of the present invention.

DESCRIPTION OF THE PREFERRED EMBODIMENTS

Figure 3:
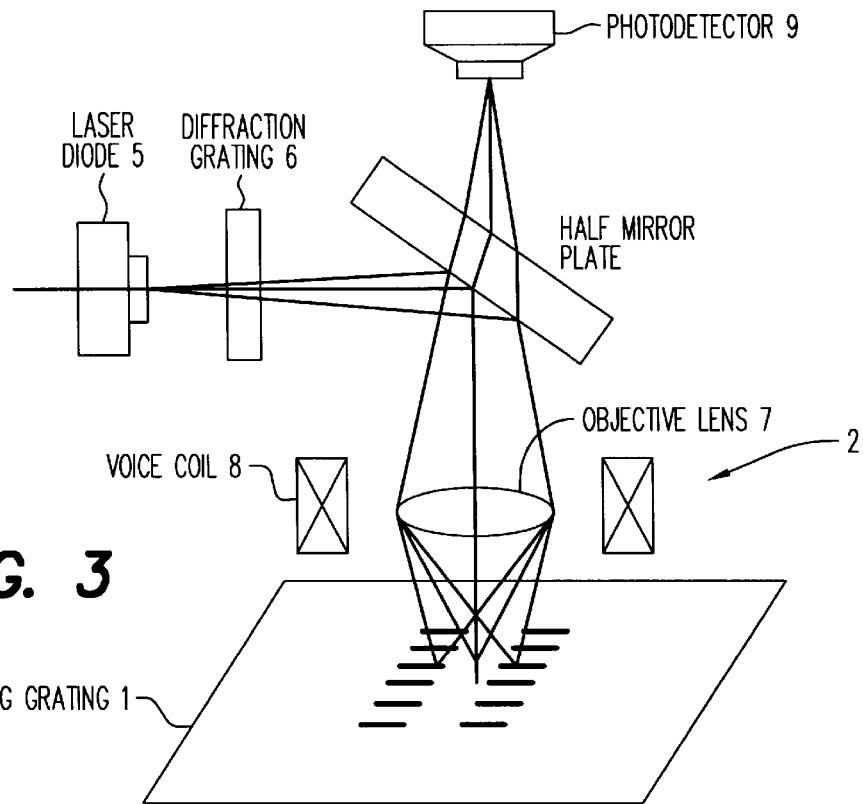
FIG. 3 is a diagram of a linear encoder according to a first embodiment of the present invention.

FIG. 3 is a diagram of a laser linear encoder comprising a scaling grating 1 and an optical read head 2 of the present invention.

Figure 4:
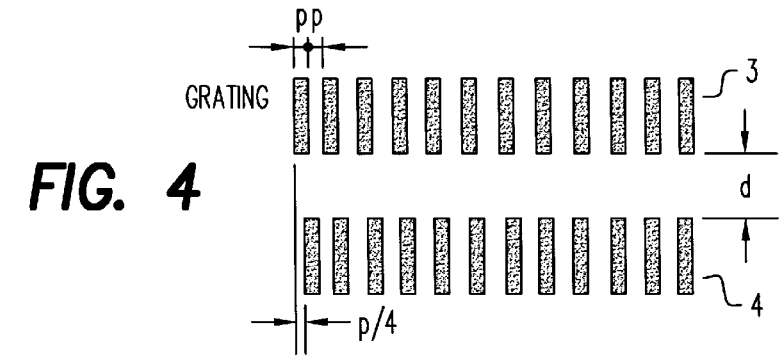
FIG. 4 is a diagram of a linear scaling grating.

In this embodiment, the scaling grating includes two sections 3,4 of reflective type of phase grating as shown in FIG. 4. The second grating 4 is identical to the first grating 3, but is displaced in the linear direction X with respect to the first grating by an amount equal to one fourth the width of a pit. Thus a 90 degree out-of-phase signal can be obtained from the two gratings. The grating has an equal width of the pit and land. The height difference between the pit and land of the phase grating is one-quarter of the laser wavelength.

The optical read head includes a laser diode 5, a three beam diffraction grating 6, an objective lens 7, a focusing actuator 8 and a six segment photodetector 9.

Figure 5:
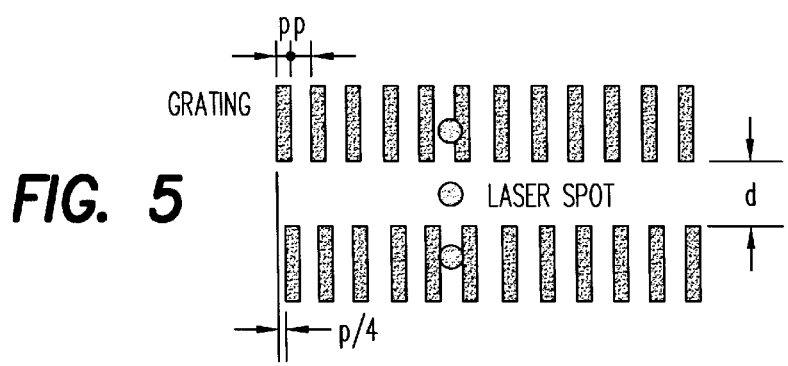
FIG. 5 is a diagram illustrating the relative position of the three spots on the surface of a scaling grating.
Figure 6:
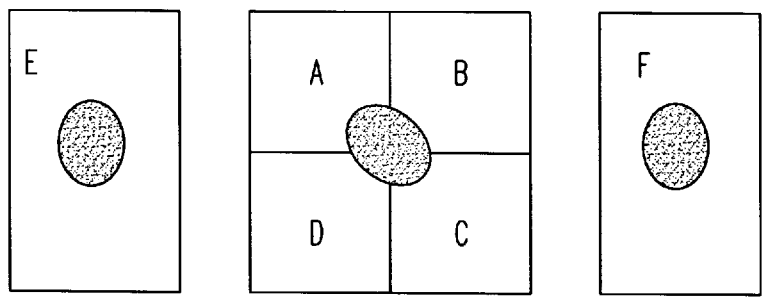
FIG. 6 is a diagram of a six segment photodetector.

The diffraction grating splits the beam from the laser diode into three beams, a middle beam and two side beams. The middle beam is focused on the smooth region without a grating structure. The two side beams are focused on the two sections of reflective type of phase grating respectively. The relative position of three spots on the surface of the scaling grating is shown in FIG. 5. The surface of the scaling grating reflects the three beam spots. The two returned side beams are received by two photodetectors respectively to indicate the out-of-phase grating signals. The returned middle beam is received by a quadratic photodetector to indicate the focus error signal. The detector receiving all of the returned beams may be a six segment photodetector as shown in FIG. 6.

Figure 7:
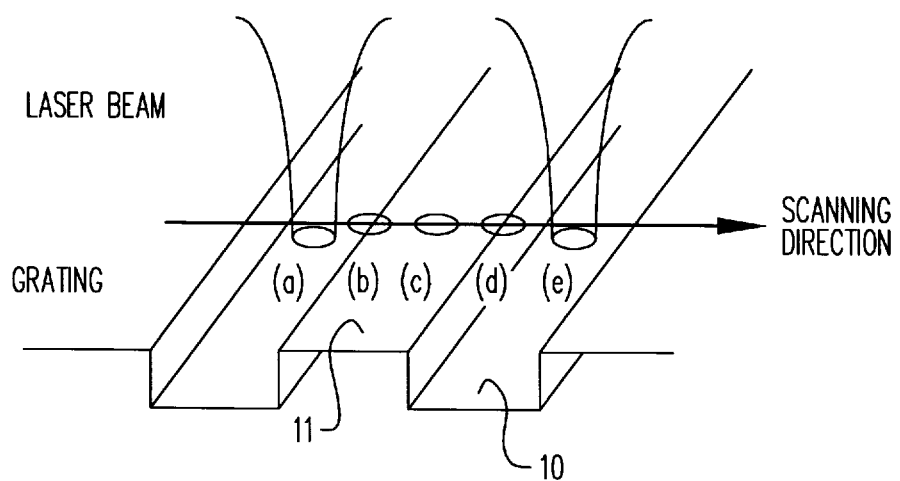
FIG. 7 is a diagram of the optical read head showing the working principle.

When a spot is exactly located on the edge of a pit 10 and land 11 as shown in FIGS. 7(b) and 7(d), the light reflected by the land travels at a distance of one-half the wavelength further than the light reflected by the pit since the height difference between the pit and land of the grating is exactly one-quarter the laser wavelength. When the reflected beam is focused on the detector, the phase difference causes the two parts of the beam to interfere destructively and cancel out each other. At this time, the intensity of the beam is the lowest. Meanwhile, there is no evidence difference between the reflection from the pure pit and land as shown in FIGS. 7(a), 7(c) and 7(e). In this case, the intensity of the beam is the highest. Therefore, a transverse movement between the optical head and the scaling grating results in changes in the optical intensity received by the side beam detectors, which are related to the displacement or linear motion. If the pitch of the grating is slightly smaller than the spot size of the laser beam, an approximate sinusoidal wave will be generated, which allows for 4×interpolation. Thus, a high resolution can be achieved. For example, if a spot size of 1.73 $\mu$m scans the grating with a pitch of 1.7 $\mu$m, a resolution of 0.4 $\mu$m can be achieved with a 4×interpolation.

The objective of the auto focus of the laser beam is to keep the minimum and constant spot size of the two side beams to scan the phase grating, which has a grating pitch slightly less than the spot size. In this situation, the reading data is no longer limited by the depth of focus. If the middle spot is used to scan the structure of the grating, some crosstalk will occur between the focus error signal and the grating signal, especially when the spot scans the step of the grating. In this situation, the overshoot is difficult to filter out because the scan frequency is not constant due to unknown speed of the encoder. For this reason, in the present invention, the middle beam is focused on the smooth region between the two sections of the grating. A stable auto focus output can therefore be obtained. The reading error caused by the changes of spot sizes can be ignored because the two side spots are very close to the middle spot.

The auto focusing function of the optical head can be carried out by driving the objective lens via a focus voice coil actuator in the optical head. Once the focal position is found, the optical head will work in a closed-loop mode. When the distance between the scaling grating surface and the optical head changes, a defocusing signal will be generated from the optical head. The defocusing signal is then sent to the controller circuit that drives the objective lens to follow the profile of the scaling grating. It can therefore keep the objective lens of the optical head a constant distance from the surface of scaling grating and the reading data is free from vibration, shock, waviness of the surface and the straightness of the slide guide.

A variety of focus error detection principles have been developed. Any one of these methods can be utilized in the current invention if it can provide a defocusing signal. FIG. 8 shows one focusing error detection method, the astigmatism method. The beam emitted from a laser diode (LD) after the beam splitter is focused by an objective lens. The surface reflects the beam back into the objective lens. The converging beam is transferred by the beam splitter to the four quadrants' photodetector. Because a tilted glass plate can generate astigmatism along the principal axis, a half mirror plate plays both the roles of beam splitter and astigmatic lens. When the original position of the surface lies in the focal plane of the objective lens, the light beam will scatter symmetrically on the detector of all four quadrants as shown in FIG. 8 (a). When the surface moves close to or far away from the focal plane, the astigmatic lens cause the intensity pattern on the detector to become elliptical as shown in FIGS. 8 (b) and 8(c). The changes in the image on the photodiode generate the focus correction signal. Therefore, we can obtain the two most important signals—the Focus Error (FE) signal and the RF signal from the output of the detector.

The FE signal is the difference between photodiode output signals of (a+c) and (b+d). The RF signal is the sum of four quadrants photodiode output signals (a+b+c+d), where a, b, c, d, represent the output of the four quadrants detector shown in FIG. 8. The RF is helpful for determining the focus position. When the surface moves close to the focal plane, in the focal plane and far away from the focal plane, it corresponds to the conditions FE<0, FE=0 and FE>0 respectively.

In the optical head, the objective lens is attached to a focus coil actuator. As the FE feeds back to the focus coil actuator, which drives the objective lens up and down following the surface of the scaling grating, the focal position related to the surface is automatically maintained.

The minimum size of the laser spot focused by the objective lens can be expressed by:

$$s = 1.22\lambda/NA \quad (1)$$

where NA is the numerical aperture of the objective lens and $\lambda$ is the laser's wavelength. For a typical case, NA=0.55, $\lambda$=780 $\mu$m, s is equal to 1.73 $\mu$m. A laser diode with the wavelength 670 nm is commercially available. In this case, s is close to 1.5 $\mu$m. To obtain an approximate sinusoidal wave, the pitch of the scaling grating should be slightly less than the focused spot size of the laser beam.

The distance d in the Y direction between the two phase gratings as shown in FIG. 4 is related to the diffraction angle $\theta$ of the three-beams diffraction grating and the length L between the diffraction grating and the objective lens. It can be expressed by:

$$P \sin\theta = \lambda \quad (2)$$

and $$d = L \tan\theta \quad (3)$$

where P is the pitch of the three-beams diffraction grating. An appropriate pitch of the three-beams diffraction grating can be chosen optically to ensure a reasonable distance between the two sections of the grating.

Figure 10:
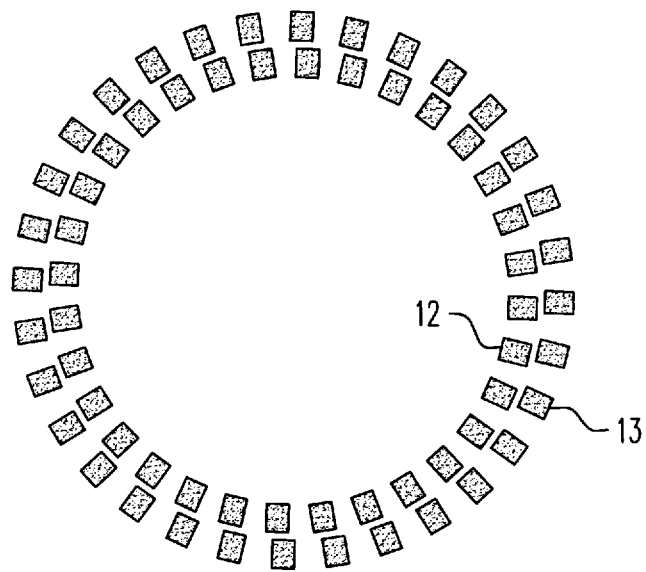
FIG. 10 is a diagram of an encoder disk.

FIG. 9 shows an embodiment in the form of a rotary encoder. This uses a circular scaling grating to replace the linear scaling grating in the linear encoder. One embodiment of such an encoder disk is schematically shown in FIG. 10.

Figure 11:
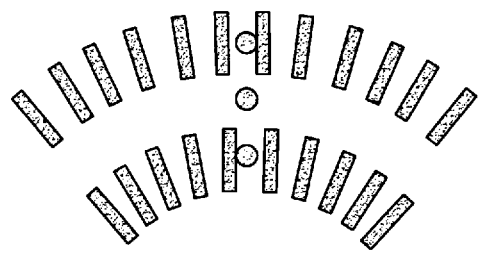
FIG. 11 is a diagram illustrating the relative position of the three spots on the encoder disk.

The pits and lands on the inner grating 12 have the same angular interval with that on the outer grating 13, but are displaced in the circumferential direction with respect to that on the outer grating by an angular amount equal to one fourth the width of the pit. Thus a 90 degree out-of-phase signal can be obtained from the two gratings. The relative position of three spots on the surface of the encoder disk is shown in FIG. 11. The grating has an equal width of the pit and land. The width of the pit in the inner grating is slightly smaller than the width of the pit in the outer grating. The height difference between the pit and land of the phase grating is one-quarter of the laser wavelength.

The resolution of the rotary encoder depends mainly on the size of the encoder disk. For example, an encoder disk with a 2 mm diameter and a grating pitch of 1.53 $\mu$m can achieve 12-bit resolution without interpolation. And an encoder disk with a 160 mm diameter and a grating pitch of 1.5 $\mu$m can achieve 1,296,000 counts per revolution (1 arcsecond) with 4×quadrature multiplication. The resolution is about 20-bit.

An encoder disk for use in the laser encoder of the present invention could be fabricated from a wafer by a lithographic technique. To improve the reflectivity of the wafer, a high reflectance metal layer, typically aluminum or gold, could be used as a covering. The encoder disk can also be fabricated from glass. Perhaps, the most convenient way to fabricate the encoder disk is to utilize the state of the art compact disk construction and have a radius of approximately 30 mm. This would make mass production easy and the cost would be very low.

The advantages of the present invention are: (1) the encoder involves only two parts of optical components and no index grating is required; (2) the encoder is less sensitive to the gap between the optical read head and the scaling grating; (3) the encoder possesses a high optical resolution and accuracy; (4) it is shock-proof and less susceptible to error due to vibration; (5) the profile of the grating surface does not affect to read out the position information; (6) the encoder is characterized by compactness, low weight and low cost.

The applications of the system are mainly in the fields of metrology, control, alignment techniques, precision engineering and manufacturing. Aside from measuring a position or rotary angle, the new method is also suitable for high accuracy on-line monitoring and for servo control systems.

We claim:

1. Apparatus for sensing the position and/or movement of an object, comprising; a laser source for generating laser light, means for dividing said laser light into three beams, a reflective grating adapted to be mounted on a said object the position and/or movement of which is to be measured, means for focussing said beams onto said grating, and means for detecting said beams reflected from said grating and for detecting any change in intensity of said reflected beams consequent upon movement of said grating.

2. Apparatus as claimed in claim 1 wherein said reflective grating comprises two grating regions extending in the direction of movement, said two regions being spaced apart by a third smooth focussing region.

3. Apparatus as claimed in claim 2 wherein each said grating region comprises a plurality of pits and lands, the difference in height between said pits and lands being equal to one quarter of the wavelength of said laser source.

4. Apparatus as claimed in claim 2 wherein said two grating regions are substantially identical, one of said regions being displaced relative to the other in the direction of movement so as to obtain direction information.

5. Apparatus as claimed in claim 1 wherein said three beams comprise two side beams and a middle beam, said side beams being focussed onto said grating so as to detect intensity changes caused by interferometric reflection, and said middle beam being a focussing beam incident on a focussing region for autofocussing.

6. Apparatus as claimed in claim 5 wherein said three beams are incident on said grating as three spots in a line perpendicular to the direction of movement of said object.

7. Apparatus as claimed in claim 1 wherein said focussing means comprises a movable objective lens.

8. Apparatus as claimed in claim 7 wherein said lens is moved in response to a focus error signal.

9. Apparatus as claimed in claim 1 wherein said detecting means comprises a six segment photodetector comprising a quadratic detector for generating a focus error signal and two segment detectors for detecting light intensity reflected from said grating.

10. Apparatus as claimed in claim 1 wherein said dividing means comprises a diffraction grating.

11. Apparatus as claimed in claim 1 for detecting incremental linear movement and position wherein said grating comprises two parallel reflective grating regions extending in the direction of linear movement.

12. Apparatus as claimed in claim 11 wherein each said grating region comprises a plurality of lands and pits of equal width, the difference in height between said pits and lands being equal to one-quarter of the wavelength of said laser source.

13. Apparatus as claimed in claim 12 wherein one said grating region is displaced relative to the other in the direction of movement by a distance equal to one-quarter of the width of a land or pit.

14. Apparatus as claimed in claim 1 for detecting incremental angular movement and position wherein said grating comprises two concentric annular reflective grating regions.

15. Apparatus as claimed in claim 14 wherein each said grating region comprises a plurality of lands and pits of equal angular width, the difference in height between said lands and pits being equal to one-quarter of the wavelength of the laser source.

16. Apparatus as claimed in claim 15 wherein one said grating region is displaced relative to the other in the direction of movement by an angular distance equal to one-quarter of the angular width of a land or pit.

* * * * *